United States Patent [19]

Leeming

[11] 4,120,195
[45] Oct. 17, 1978

[54] METHOD OF USING EMBEDDED NORMAL STRESS SENSORS IN PROPELLANT GRAINS

[75] Inventor: Harold Leeming, Redlands, Calif.

[73] Assignee: The United States of America as represented by the Secretary of the Air Force, Washington, D.C.

[21] Appl. No.: 823,556

[22] Filed: Aug. 11, 1977

[51] Int. Cl.² ............................................. G01L 1/22
[52] U.S. Cl. ...................................... 73/768; 73/116; 73/765
[58] Field of Search ................... 73/88.5 R, 88.5 SD, 73/116; 60/234

[56] References Cited
U.S. PATENT DOCUMENTS 3,245,252  4/1966  First et al. ...................... 73/88.5 R
3,922,597  11/1975  Nagase ......................... 73/88.5 R X

*Primary Examiner*—Jerry W. Myracle
*Attorney, Agent, or Firm*—Joseph E. Rusz; Henry S. Miller, Jr.

[57] ABSTRACT

An embedded stress sensor gage for use in solid fuel rocket motors and the like consisting of a modified bridge circuit containing temperature sensitive resistive elements and a pair of series connected resistors coupled in parallel with the bridge. A comparison of the voltage at the midpoint of the series connected resistors and the output voltage of the bridge and the voltages at the active resistive elements provides information from which it is possible to determine the change in gage element resistance for each temperature and stress condition.

1 Claim, 1 Drawing Figure

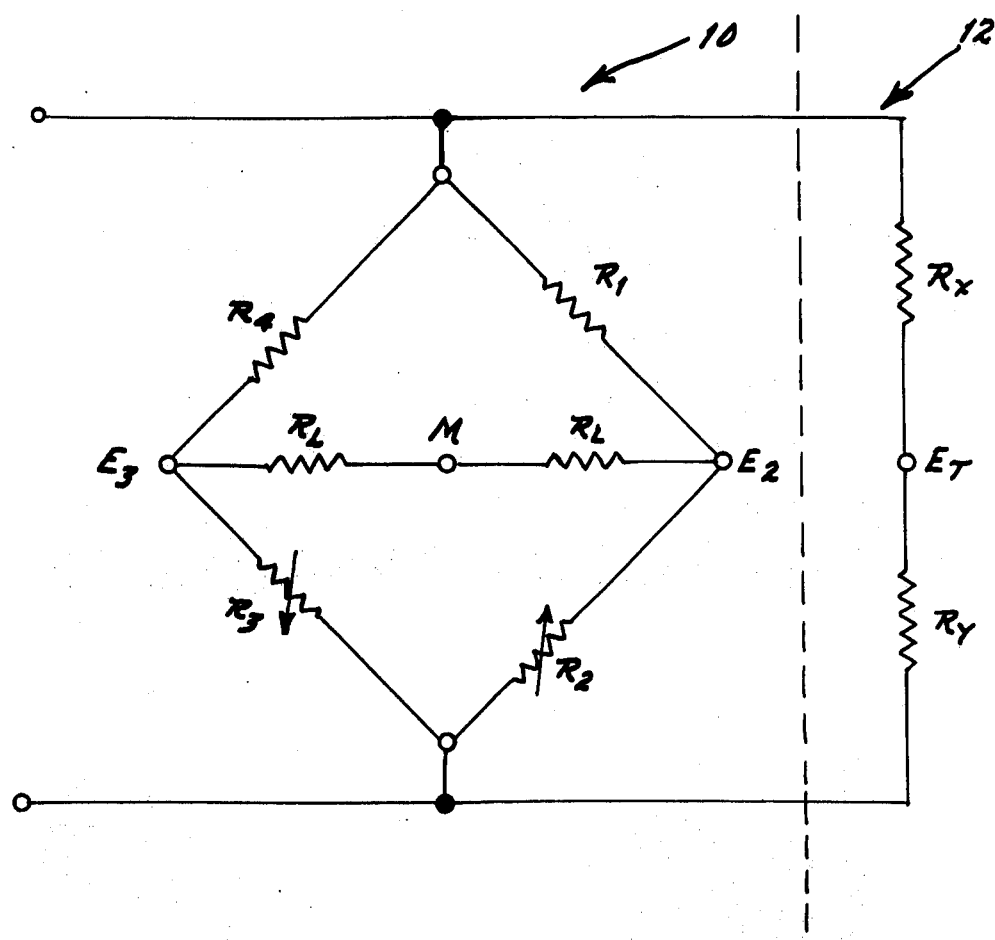

4,120,195

METHOD OF USING EMBEDDED NORMAL STRESS SENSORS IN PROPELLANT GRAINS

STATEMENT OF GOVERNMENT INTEREST

The invention described herein may be manufactured and used by or for the Government for governmental purposes without payment of any royalty thereon.

BACKGROUND OF THE INVENTION

This invention relates generally to stress sensor gages and more particularly to a method and means for determining the presence of drift in the output signals of such gages.

While there are many applications for the well-known and conventional stress gage, one of the more important uses is in rocket engines. Stress gages are embedded in solid fuel rocket motors and from them it is possible to predict satisfactory performance after the fuel has been in storage for substantial lengths of time. There are, of course, other applications where a stress gage would be rendered inaccessible and this invention would apply.

The stress gage, embedded in a solid fuel rocket particularly, frequently suffer from what is referred to as "epoxy creep" or gage element slippage. This condition may be caused by a plurality of factors, however, the result of this and other internal and nonrelated factors, is drift in the output signal of the gage. This drift, particularly if relatively constant, is difficult to detect and often results in erroneous test readings.

The invention presented hereinafter is particularly adapted to overcome the disadvantages of the prior art by enabling more accurate and reliable stress measurements to be obtained from an embedded or inaccessible stress gage.

SUMMARY OF THE INVENTION

According to the invention a stress gage of conventional design is positioned and located as necessary. A bridge circuit is associated with the gage and is the known method for making measurements and providing output to a measuring device. A pair of series connected resistors are coupled in parallel with the bridge and voltage measurements are then made at the midpoint of the series connection and the output of the bridge and the active resistive element. If the gage elements are formed of a semiconductor material it is possible to detect temperature variation in the sensor elements. The gage elements are bonded to the diaphragm gage at the same time and same thermal history changes in resistance are caused by epoxy creep or gage slippage. As two readings are recorded from the gage, if they are of equal magnitude and opposite in sign there is an indication of no drift within the system. If, on the other hand, there is a variation in magnitude or sign there is a positive indication of some drift within the system.

It is therefore an object to provide a new and improved method of utilizing embedded stress sensors in rocket propellant grains.

It is another object of the invention to provide a new and improved means for utilizing embedded stress sensors in rocket propellant grains.

It is a further object of the invention to provide a new and improved means for utilizing stress sensors that are more accurate then any heretofore known.

It is still another object of the invention to provide a new and improved means for utilizing stress sensors that are more reliable then those currently available.

It is still a further object of the invention to provide a new and improved stress sensor means that is able to detect drift caused by creep, slippage or other internal disruptions.

It is another object of the invention to provide a new and improved stress sensor which is economical to produce and utilizes conventional currently available components that lend themselves to standard mass production manufacturing techniques.

These and other advantages, features and objects of the invention will become more apparent from the following description taken in connection with the illustrative embodiment in the accompanying drawing.

BRIEF DESCRIPTION OF THE DRAWING

The FIGURE is a circuit diagram of the invention.

DESCRIPTION OF THE PREFERRED EMBODIMENTS

Referring now to the FIGURE, a conventional stress gage consists of a bridge circuit shown generally at 10. The bridge circuit output, i.e., $E_3 - E_2 \equiv E_o$ is measured and recorded as the only output. The addition of two new resistors shown generally at 12 provides another output that can be used to provide a more accurate measurement. Resistors $R_x$ and $R_y$ are added and measurements taken between their junction and $E_2$ or $E_3$ or their midpoint M between load resistors $R_L$. A voltage may be measured which varies with the sensor temperature when active gage elements $R_2$ and $R_3$ are made of semiconductor material. By monitoring $(E_t - E_2)$ or $(E_t - E_3)$ in addition to $E_o \equiv E_3 - E_2$ it is possible to determine the changes in the gage element resistance for each temperature and stress condition. Typically, both gage elements are bonded to the diaphragm at the same time and subjected to the same thermal history and hence will exhibit similar changes in resistance due to epoxy creep or slippage. It can then be easily determined the amount of resistance change due to stress and the amount due to slippage.

For example, if a gage contains two active elements $R_2$ and $R_3$ and if $R_2$ increases in resistance under stress and $R_3$ decreases in resistance under stress, and further, it is assumed that the measured change in gage element resistance comprises two components a constant $\Delta$ due to creep, slippage, etc., and a component due to stress then:

$$\Delta R_2 = \Delta + K_2 \sigma$$

and $$\Delta R_3 = \Delta - K_3 \sigma$$

further assuming that the drift component is the same for both gage elements then $\Delta R_2 - \Delta R_3 = \sigma(K_2 + K_3)$ $$/ \sigma = \frac{\Delta R_2 - \Delta R_3}{K_2 + K_3}$$

Knowing the stress, the equivalent change in $E_o$ (gage output) can then be calculated and the change in gage output under zero stress can be estimated.

In cases where there are sudden variations in gage output examination may show the change to be caused by a change in one gage element. In this particular case, the equivalent change in zero stress reading for the gage can still be determined.

The overall effect of making two readings rather than merely the usual single gage output ($E_o$) is to enable considerably more accurate and reliable stress measurements to be obtained from an embedded stress gage.

Although the invention has been described with reference to a particular embodiment, it will be understood to those skilled in the art that the invention is capable of a variety of alternative embodiments within the spirit and scope of the appended claims.

I claim:

1. In an improved process for utilizing embedded stress sensors having a modified bridge circuit containing temperature sensitive active resistive elements and first and second serially connected resistors coupled in parallel with said bridge, comprising the steps of connecting the output of the bridge circuit to a diaphragm gage; measuring the voltage of the bridge circuit; detecting a voltage output between one point on the bridge circuit and a point between the serially connected first and second resistors; and monitoring changes in the diaphragm gage output to determine changes in temperature and stress conditions.

* * * * *